United States Patent [19]

Wright

[11] 4,158,585

[45] Jun. 19, 1979

[54] WASHBASIN LINER METHOD AND ARTICLE

[76] Inventor: Melvin A. Wright, 4517 Seagrave Ave., Richmond, Va. 23234

[21] Appl. No.: 764,785

[22] Filed: Feb. 2, 1977

[51] Int. Cl.² .......................... A47K 3/02; B32B 31/14
[52] U.S. Cl. .................................... 156/94; 4/173 R; 156/245; 156/285; 156/289; 156/293
[58] Field of Search ................. 156/94, 245, 285, 289, 156/293; 264/219, 220, 225, 226, 227; 4/4, 5, 173 R, 187 R, DIG. 9

[56] References Cited

U.S. PATENT DOCUMENTS

| | | | |
|---|---|---|---|
| 1,081,987 | 12/1913 | Price | 4/173 R |
| 1,961,360 | 6/1934 | Herndon et al. | 4/173 R |
| 1,992,008 | 2/1935 | Innis | 4/173 R |
| 2,080,601 | 5/1937 | Cappuccio | 4/173 R |
| 2,784,417 | 3/1957 | Strand | 4/173 R |
| 3,045,254 | 7/1962 | Cook et al. | 4/173 R |
| 3,088,124 | 5/1963 | Cony | 4/173 R |
| 3,614,793 | 10/1971 | Nemiroff | 4/173 R |
| 3,931,651 | 1/1976 | Weir | 4/173 R |
| 4,043,853 | 8/1977 | Saladino | 4/173 R |
| 4,067,071 | 1/1978 | Altman et al. | 4/173 R |

OTHER PUBLICATIONS

"Rigidized Plexiglas", Rohm and Haas Co., PL-1130a, Nov. 1976.
"Second-Surface Reinforced Thermoformed Acrylic Parts: Materials and Procedures for Manufacture," Rohm & Haas, 1973.
"Swedcast Acrylic Shows its Form in the One-Piece," Swedlow, Inc., AD SD-123.

Primary Examiner—Caleb Weston
Attorney, Agent, or Firm—Griffin, Branigan and Butler

[57] ABSTRACT

A method of renovating washbasins, such as bathtubs, and the article of a renovated washbasin according to this invention involves a thermoformed sheet of acrylic plastic folded to have a shape substantially identical to that of the exterior surface of a washbasin to be renovated. The thermoformed sheet of plastic has a reinforcing resinous backing applied to a backside thereof. This forms a washbasin liner. The liner is adhered to the surface of the washbasin with a water resistant adhesive over the entire surface covered by the liner. A renovated washbasin is thereby formed. In a preferred embodiment a "plug" in the shape of a washbasin to be renovated is formed in situ on the washbasin and a master mold is then prepared from the plug. The master mold is used for shaping the thermoformed sheet of acrylic plastic and the reinforcing backing is sprayed thereon.

17 Claims, 12 Drawing Figures

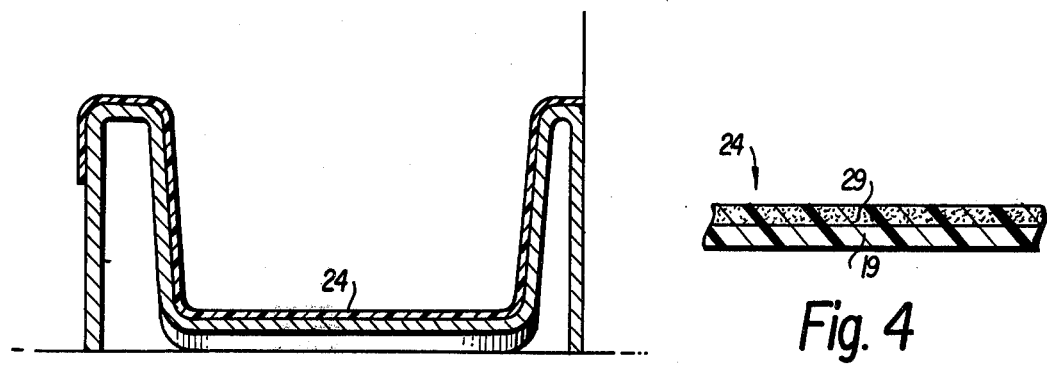
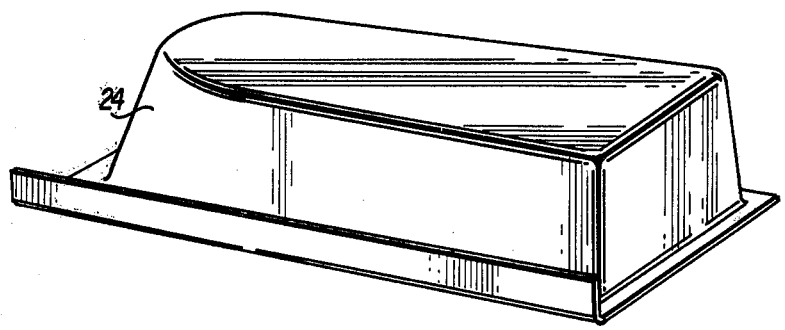
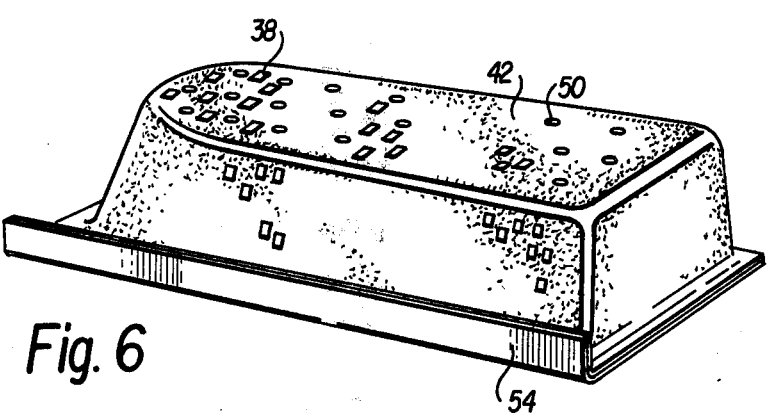
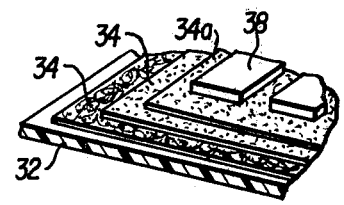
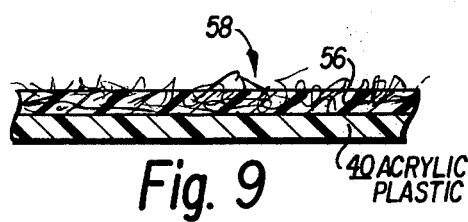
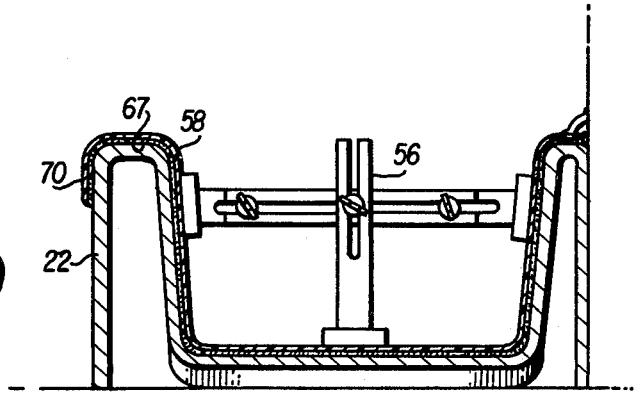

WASHBASIN LINER METHOD AND ARTICLE

BACKGROUND OF THE INVENTION

This invention relates broadly to the art of washbasins, such as bathtubs, and the like, and more particularly, to methods and apparatus for renovating the washbasins, and to the renovated washbasins thereby formed.

Washbasins, including bathtubs, and the like, after prolonged use usually develop discolored and potted surfaces. Such surfaces are not only unsightly but are more difficult to clean than new surfaces. Wear to washbasins, especially bathtubs, in hotels and motels is a particularly acute problem. It has been estimated that of the approximately 2 million hotel and motel bathtubs in the United States, 10% must be upgraded per year.

In a prior-art method of renovating bathtubs, the bathtubs, after being thoroughly cleaned, are painted with an acrylic paint. Although this solution "rebuilds" the surfaces of the washbasins for the moment it is usually not sufficiently durable. Surfaces which have been thusly treated, after frequent use, usually last only between one and three years. In addition, once these surfaces begin to deteriorate they actually look worse than they did before the acrylic paint was applied. The washbasins then must often be torn out and replaced.

Some prior-art U.S. patents have suggested the use of bathtub liners for renovating bathtubs. For example, U.S. Pat. No. 3,614,793 to Nemiroff discloses a sheet-steel bathtub liner which is inserted into an existing bathtub. The liner of this patent is made quite a bit smaller than the existing bathtub and the space between the two is taken up with a filler material. When the liner is inserted into the bathtub, a liner ledge is simply supported upon a ledge portion of the tub. This technique requires new fixtures to be installed due to the gap between the liner and the tub. In addition, because the liner is separated so far from the existing tub, there is a possible problem of bacteria, mold, and the like forming between the two units, which is undesirable. Thus, it is an object of this invention to provide a washbasin and bathtub liner which does not require specialized fixtures and which does not create a space between the liner and the bathtub in which bacteria, mold, and the like can reproduce.

Also, in the Nemiroff patent, the liners thereof are made from standardized specifications to mate with known tubs. There are literally hundreds of various types of hand washbasins and bathtubs, thus, it would be difficult to maintain a stock of all of the types of hand washbasins and bathtubs. Thus, it is another object of this invention to provide a method for renovating washbasins which can be used with all washbasins, including bathtubs no matter what their sizes or shapes are.

U.S. Pat. No. 3,045,254 to Cook et. al. discloses a bathtub liner which includes an outer layer of semi-flexible water impervious sheet material and an inner layer adhered to the outer layer of a compressable material such as foam rubber. The liner of this patent is attached to an existing bathtub by means of a U-shaped flange which extends about a hook flange on the edge of an existing bathtub. Thus, to use this system, the bathtub must be of a specific type having the necessary flange. It is an object of this invention to provide a renovating bathtub liner which can be used with all types of bathtubs. The problem also exists in Cook et. al. of bacteria and mold reproducing in the space formed between the liner and the surface of the existing bathtub as was mentioned above.

It is a further object of this invention to provide an economical method of renovating washbasins, including bathtubs, which produces a novel renovated washbasin having a new finish which is strong, stain-resistant, water-resistant, and abrasion-resistant. It is also an object of this invention to provide such a novel renovated washbasin.

SUMMARY OF THE INVENTION

According to principles of this invention, a method of improving a washbasin to produce a novel renovated washbasin includes the steps of making in situ a "plug" of the washbasin to be renovated and making a master mold therefrom. The mold is then used to thermoform a heated sheet of acrylic plastic. After the sheet of plastic is cooled into its new washbasin shape, a reinforcing backing is sprayed onto the backside thereof thereby forming a washbasin liner. A water resistant adhesive is then placed between the exterior surface of the washbasin and the backside of the liner to adhere the liner to the washbasin.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

FIG. 3 is a view taken on line 3—3 of FIG. 2;

FIG. 4 is a sectional view taken of a small portion of the "plug" of FIG. 2 showing the main layers thereof;

FIG. 5 is an isometric view of the plug in FIGS. 2-4 when it is removed from the bathtub and inverted;

FIG. 6 is an isometric view of a master mold on the plug of FIG. 5;

FIG. 6A is an isometric view of the layers of the master mold of FIG. 6;

FIG. 9 is a sectional view of a small portion of the liner of FIG. 8 showing the two main layers thereof;

FIG. 10 is a sectional view of the liner of FIGS. 6, 6A, 8 and 9 when it is held in the bathtub of FIG. 1 with a jig for gluing; and, FIG. 11 is an isometric view of the bathtub of FIG. 1 after it has a liner applied thereto in accordance with this invention.

DETAILED DESCRIPTION OF THE INVENTION

Figure 1:
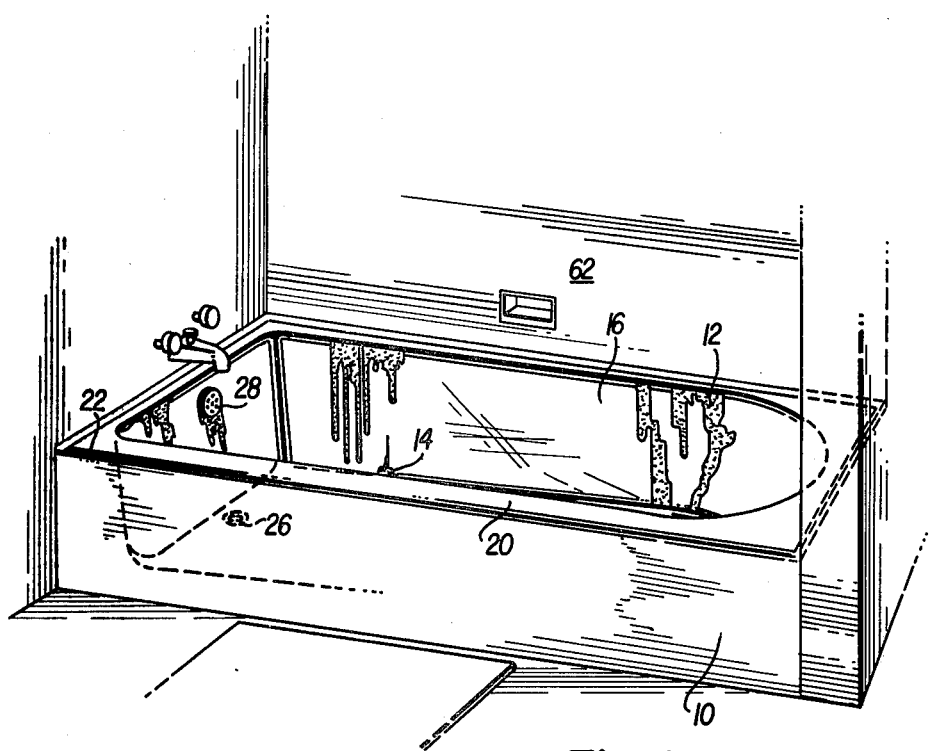
FIG. 1 is an isometric view of a discolored existing bathtub.
Figure 2:
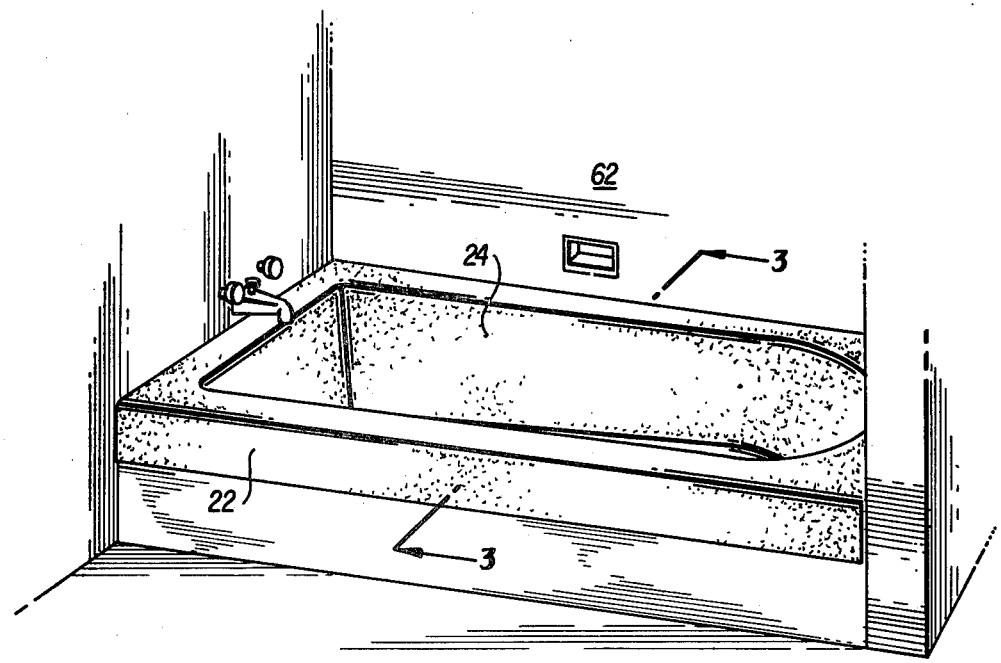
FIG. 2 is an isometric view of the bathtub of FIG. 1, during a "plug-making" step of the method of this invention.

A bathtub 10 to be renovated with this method in accordance with this invention has discoloring 12 and chips 14 on the interior surface 16 thereof. To renovate this bathtub in accordance with a preferred mode of this invention a mold of the bathtub must first be built. To do this the interior surface 16 of the bathtub 10 is first waxed with a mold-release paste wax, such as a product sold under the trademark "Mirrorglaze Wax", by Mirror Bright Polish Co. or a product sold under the trademark "Cerra Wax" by Cerra Products Co. Thereafter, a polyester resin layer 19 (FIG. 4) is painted onto the interior surface 16, the top or ledge surface 20, and at least two inches of the front wall 22 to begin the formation of a plug 24 as is depicted in FIG. 2 and 3. It should be noted that before the plug 24 is begun as described above, the fixtures for the main drain 26, and the overflow drain 28 could be removed, however, it is not necessary. After the polyester resin has hardened a layer 29 of polyester resin and glass fibers (fiberglass) is applied to the outside surface of the initial polyester resin coat to give body to the plug 24. After the plug 24 has been fully cured, it is removed from the bathtub 10 and taken to a factory.

A master mold is now made from the plug. To accomplish this, the plug 24 is inverted as is shown in FIG. 5. Multilayers of tooling gel coat 32 (FIG. 6A) are coated onto the plug 24. The tooling gel coat 32 is a hard polyester resin often used in the construction of molds. It is relatively flexible and can be sanded and worked to have a smooth finish. Once the tooling gel coat has fully hardened, three subsequent layers 34 of polyester resin having glass fibers therein (fiberglass) are applied thereto. Finally, 2 in.×2 in.×½ in. pieces of balsa wood 38 are applied to the last coat of polyester resin 34a. The pieces of balsa wood 38 add strength to a completed master mold 42. These various layers of the master mold provide a wall thickness of approximately one inch. The first layer 32 of tooling gel coat provides a smooth, shaped surface on which a bathtub liner can be shaped in accordance with this invention.

Figure 7:
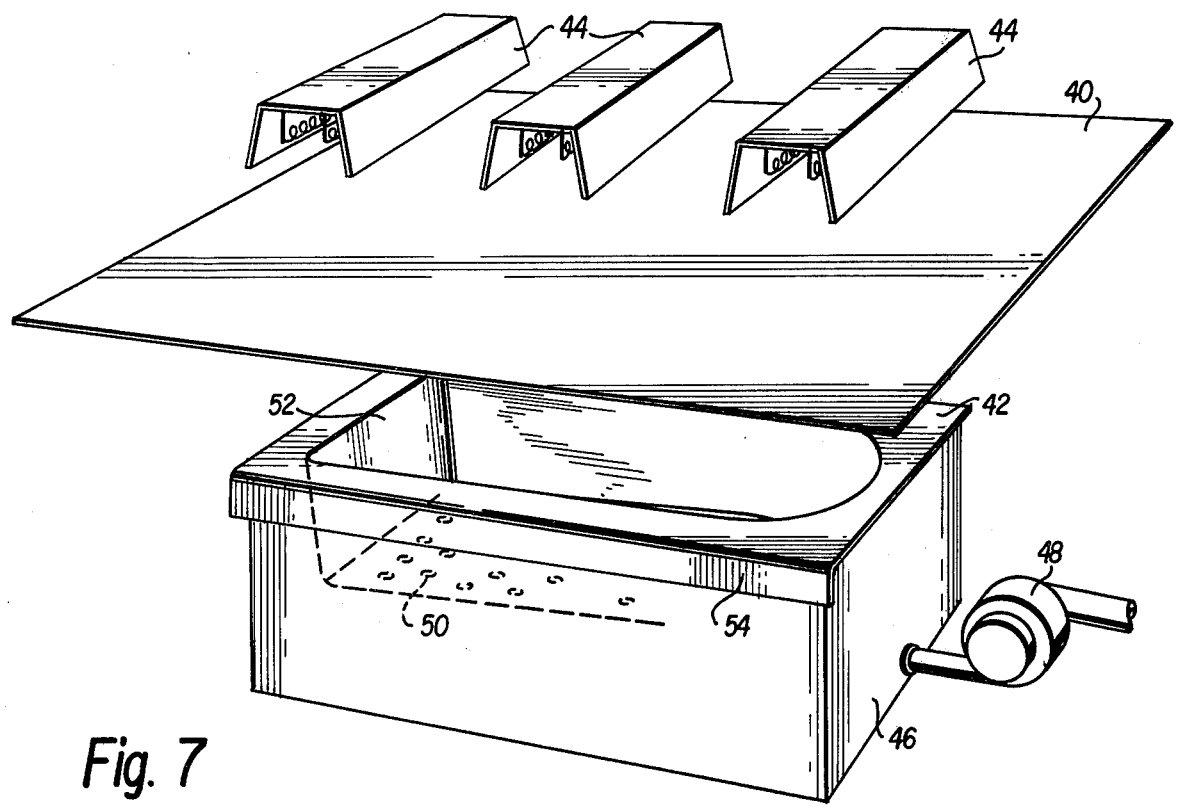
FIG. 7 is a schematic, isometric view illustrating the manner in which a sheet of plastic is vacuum formed to the master mold of FIG. 6.

Describing the shaping of a liner, with reference to FIG. 7, a 125 mil thick sheet 40 of acrylic plastic is held about the outer edges thereof (holding mechanism not shown) above the master mold 42 made in accordance with the above-described directions. The sheet of acrylic plastic 40 is heated by overhead radiant heaters 44. The master mold 42 is resting, right side up (inverted from FIG. 6) on a manifold box 46, the interior of which communicates with a vacuum pump 48. In this respect, the master mold 42 has a plurality of holes 50 in the bottom thereof for allowing communication of a vacuum created by the vacuum pump 48 in the manifold box 46 to the exterior of the master mold 42. In this respect, once the sheet 40 of acrylic plastic is sufficiently heated (350° F. to 400° F.), and thereby softened, it is lowered onto the master mold 42 and a vacuum is applied to the vacuum pump 48. The vacuum communicates with the sheet 40 via the holes 50 to pull a central portion of the sheet 40 into a cavity 52 of the master mold 42. It should be remembered that the peripheral edges of the sheet 40 are held against inward movement by a holding means not shown. The outer edges of the sheet 40 are pulled downwardly by the holding means so that they cover a downward lip 54 of the master mold 42 corresponding to the front wall 22 of the bathtub 10. The sheet 40 is then cooled by blowing cool air onto it.

Figure 8:
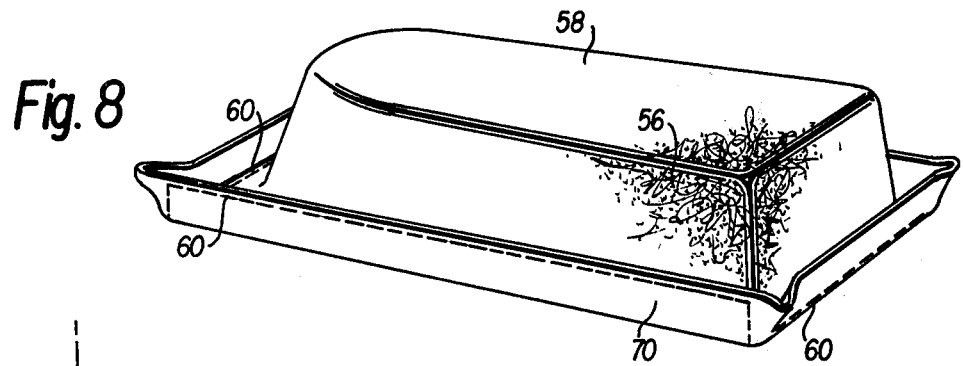
FIG. 8 is an isometric view of the sheet of plastic of FIG. 7 after it is formed and has a reinforcing, resinous backing applied to a portion thereof.

Once the shaped sheet 40 has hardened, it is lifted from the master mold 42 and has a shape as is depicted in FIG. 8. Thereafter, fiberglass (polyester resin mixed with glass fibers) 56 is sprayed with a gun onto the underside of the molded sheet to a thickness between 75 to 150 mils, preferably 125 mils, to form a reinforced bathtub liner 58 as is depicted in FIGS. 8 and 9.

Several types of acrylic plastics can be used as the acrylic plastic sheet 40. In this respect, in the preferred embodiment, acrylic plastic sheets sold by Rohm and Haas under the trademark DR61 and under the trademark Plexiglas DR are used. This acrylic plastic is an extruded acrylic sheet which is made from high impact acrylic molding pellets. However, acrylic plastics sold under the trademarks Plexiglas G and Plexiglas K by Rohm Haas will also work. These materials are found to be more brittle than the DR61 and Plexiglas DR and are therefore not preferred. Other types of acrylic plastic that will also work in the practice of this invention include acrylic sheets sold by Swedlow, Inc. under the trademark Swedcast, ABS sheets and a material sold by DuPont including acrylic plastic. A discussion of these various types of acrylic plastics which can be used in the practice of this invention is found in the Report of the 28th Annual Technical Conference, 1973, Reinforced Plastics/Composites Institute, the Society of the Plastics Industry, Inc., Section 7-B, page 1 (paper presented by G. J. Welsch and G. G. Freygang) which is filed in the Patent Office to be placed in the application file and to be incorporated by reference herein.

Although the acrylic plastic sheet 40 is 125 mils thick before thermoshaping in the preferred embodiment, it can be within a range of from 50 mils to 125 mils and still function properly. In this respect, after the sheet is thermoformed its thickness varies depending on the amount of deformation of particular areas.

Figure 11:
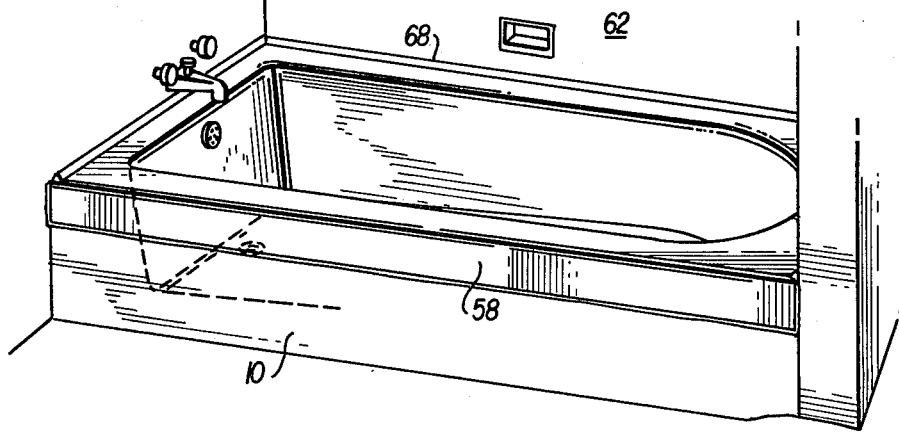

Once the liner 58 is reinforced with fiberglass it is rough cut as along dotted lines 60 (FIG. 8) for example, and taken to the cite of the bathtub 10. At the bathtub 10 the liner 58 is custom cut to exactly fit walls 62 adjacent to the bathtub 10. If it has not already been done, the drain 26, overflow 28 fixtures are removed from the bathtub 10. The bathtub is then thoroughly cleaned with naptha or some other solvent such as methylethyl ketone to get all soap film cleaned away as well as bacteria and mold. An adhesive 67 is then applied to the surface of the bathtub 10 which will be in contact with the liner 58 once it is in place. In this respect, care must be taken that those areas around the drains 26 and 28 have plenty of adhesive. Likewise, the top surface or ledge 20 of the bathtub as well as the top of the front wall 22 must have sufficient amounts of adhesive thereon. The liner 58 is then placed in the tub 10 as depicted in FIG. 10 and held in position by jig or a clamp 56 as is depicted in FIG. 11. After the glue, or adhesive, has dried, a tile molding or silicon corking 68 can be applied in the corners 70 between the bathtub 10 and its surrounding walls 62. The fixtures for the drains 26 and 28, are then remounted onto the bathtub 10.

The adhesive that is used to adhere the liner 58 to the tub 10 must be water resistant. A preferred adhesive which can be used in this invention is sold under the trademark Macco-LN-602 by SCM Corporation. This adhesive is also sold by SCM Corporation under the trademark Liquid Nail Construction Adhesive and conforms with the American Plywood Association Specification AFG-01 and the Department of Housing and Urban Development, Federal Housing Administration "Use of Materials Bulletin UM-60". Another adhesive which will also work in this invention, is sold under the trademark A₀1600 Ceramic Wall Tile Adhesive, Solvent Adhesive-Type I, by American Olean, a division of National Gypsum Company.

An overhanging outer flange 70 of the liner 58 is not unduly noticeable. However, if it is desired, a facing apron can be molded and adhered to the front of the bathtub 22 in the same manner as was described for the liner 58.

It will be appreciated by those skilled in the art that the liner of this invention provides a hard and beautiful surface for renovated bathtubs or other types of washbasins. In addition, it is relatively inexpensive to renovate bathtubs using the method of this invention. For example, it has been found to cost about ¼ the price of replacing a bathtub when at least 35 bathtubs of same shape and size are simultaneously renovated. In this respect, the method of this invention is particularly applicable to renovate the bathtubs of apartment buildings, motels and hotels. Bathtubs which have been renovated using the method of this invention last as long as new bathtubs.

Although this invention has been described with reference to a particular embodiment, it should be understood by those skilled in the art that the methods and apparatus of this invention can be modified and still remain within the scope of the invention. For example, if an ABS sheet material is used for the plastic sheet 40 then it would not be necessary to reinforce it with a resinous material. In fact, it would be difficult to form a bond between the ABS material and a resinous reinforcing material.

The embodiments in which an exclusive property or privilege are claimed are defined as follows:

1. A method of renovating a washbasin comprising the steps of:
   forming a plug at said washbasin to be renovated by applying a first hardening material to the interior surface of said washbasin, allowing the hardening material to harden, and removing said plug from said washbasin;
   applying a second hardening material to the exterior surface of said plug, and allowing said second hardening material to harden to form a master mold which is removed from said plug;
   heating a sheet of plastic;
   thermoforming said sheet of heated plastic to have a shape substantially identical to that of the interior of the washbasin by sucking said heated sheet of plastic into said master mold by means of a vacuum applied through said master mold;
   removing said thermoformed sheet of plastic from said master mold and applying reinforcing resinous backing to the back side of said thermoformed sheet of plastic, said reinforcing resinous backing including a strengthening filler mixed therewith;
   applying a water-resistant adhesive between substantially the entire interior surface of said washbasin and substantially the entire backside of said reinforced thermoformed sheet of plastic to adhere said reinforced thermoformed sheet of plastic to said washbasin;
   said thermoformed shaped plastic having a thickness of from 50 to 125 mils substantially throughout and said reinforcing resinous backing having a thickness within the range of from 75 to 150 mils.

2. A method as in claim 1 wherein said second hardening material includes at least a first layer of tooling gel, or a hard polyester resin.

3. A method as in claim 1 wherein said reinforcing resinous backing is applied to the back side of said thermoformed sheet of plastic to have a thickness of approximately 125 mils.

4. A method as in claim 3 wherein said sheet of plastic has a thickness of around 125 mils.

5. A method as in claim 1 wherein said thermoformed sheet of plastic is an acrylic plastic.

6. A method as in claim 5 wherein said reinforcing resinous backing is a polyester resin.

7. A method as in claim 6 wherein said polyester resin is sprayed onto the backside of said thermoformed sheet of plastic once it is removed from said master mold.

8. A method as in claim 1 wherein said first hardening material includes at least a first layer of polyester resin without fibers therein.

9. A method as in claim 8 wherein said first hardening material includes at least one further layer of polyester resin having fibers therein.

10. A method as in claim 8 wherein said second hardening material includes at least a first layer of tooling gel, or a hard polyester resin.

11. A method as in claim 10 wherein said second hardening material includes at least one further reinforcing layer of polyester resin.

12. A method as in claim 1 wherein said strengthening filler is glass fibers (fiberglass).

13. A method as in claim 12, wherein said fiberglass is sprayed onto the backside of said thermoformed sheet of plastic once it is removed from said master mold.

14. A method as in claim 13 wherein said thermoformed sheet of plastic is an acrylic plastic.

15. A method as in claim 13 wherein said reinforcing resinous backing is sprayed onto the backside of said thermoformed sheet of plastic to have a thickness of approximately 125 mils.

16. A method as in claim 15 wherein said sheet of plastic has a thickness of around 125 mils.

17. A method of renovating a washbasin comprising the steps of:
   forming a plug at said washbasin to be renovated by applying a first hardening material to the interior surface of said washbasin, allowing the hardening material to harden, and removing said plug from said washbasin;
   applying a second hardening material to the exterior surface of said plug, and allowing said second hardening material to harden to form a master mold which is removed from said plug;
   heating a sheet of plastic;
   thermoforming said sheet of heated plastic to have a shape substantially identical to that of the interior of the washbasin by sucking said heated sheet of plastic into said master mold by means of a vacuum applied through said master mold;
   removing said thermoformed sheet of plastic from said master mold and applying reinforcing resinous backing to the back side of said thermoformed sheet of plastic, said reinforcing resinous backing including a strengthening filler mixed therewith;
   applying a water-resistant adhesive between substantially the entire interior surface of said washbasin and substantially the entire backside of said reinforced thermoformed sheet of plastic to adhere said reinforced thermoformed sheet of plastic to said washbasin;
   said sheet of plastic having a thickness of approximately 125 mils and said reinforcing resinous backing having a thickness of approximately 125 mils.

* * * * *